May 31, 1966 W. B. WILSON 3,253,848
LATCH BOLT ASSEMBLY WITH COLLAPSIBLE RETRACTOR
Filed Aug. 10, 1962 3 Sheets-Sheet 1

Inventor.
William B. Wilson.
By Wilson & Geppert
Attorneys.

May 31, 1966 W. B. WILSON 3,253,848
LATCH BOLT ASSEMBLY WITH COLLAPSIBLE RETRACTOR
Filed Aug. 10, 1962 3 Sheets-Sheet 2
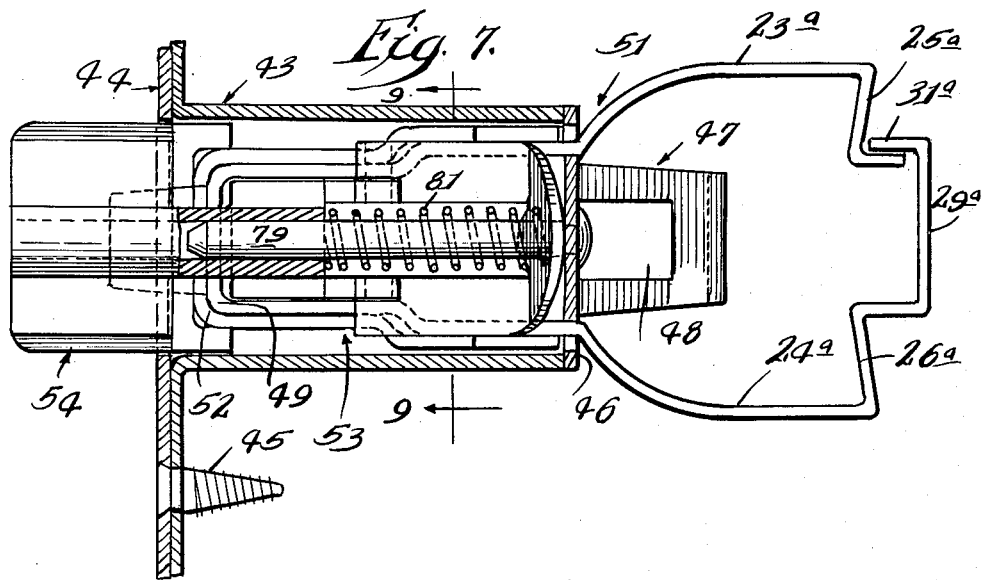
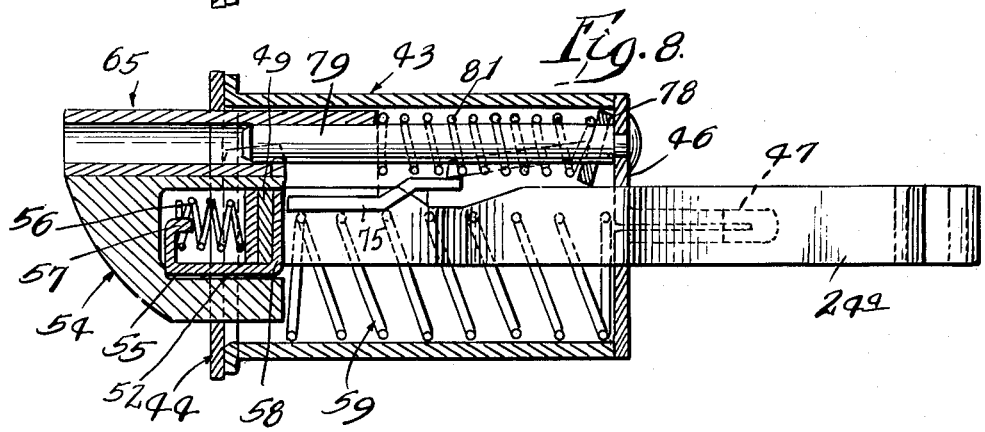
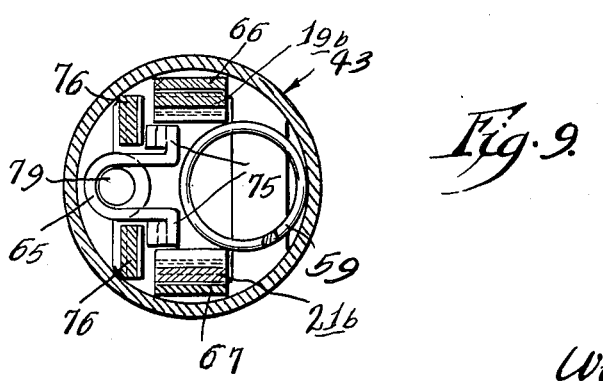
Inventor.
William B. Wilson.
By Wilson & Geppert
Attorneys.

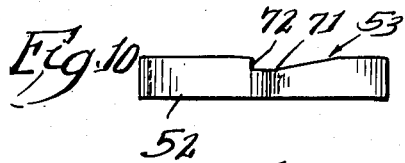
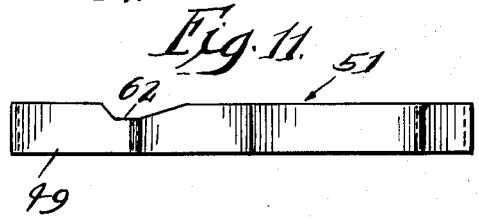
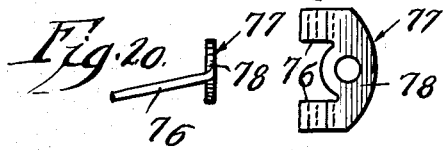
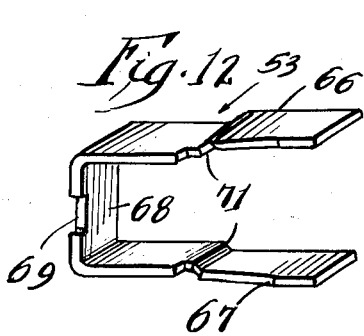
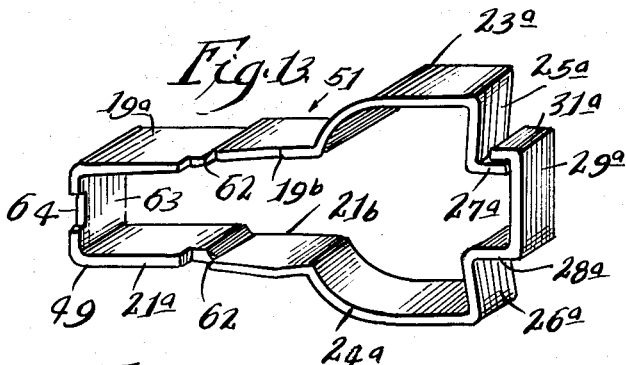
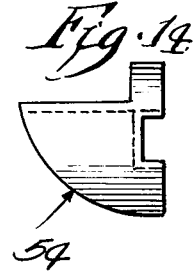
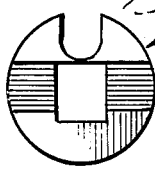
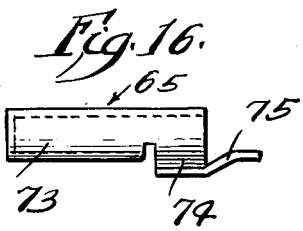
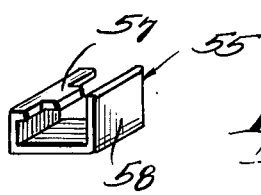
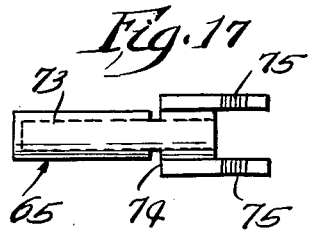

United States Patent Office 3,253,848
Patented May 31, 1966

3,253,848
LATCH BOLT ASSEMBLY WITH COLLAPSIBLE RETRACTOR
William B. Wilson, La Habra, Calif., assignor to National Lock Co., Rockford, Ill., a corporation of Delaware
Filed Aug. 10, 1962, Ser. No. 216,264
4 Claims. (Cl. 292—169)

The present invention relates to door latches or locks in which the door or closure is equipped with a latch bolt adapted to project into a recess framed by a striker plate in the edge of a door jamb. Such latch bolts are urged by suitable spring pressure into latching engagement with the striker plate and the latch bolt retracted by turning of a knob or handle when the door is to be opened.

Such latches or locks embodying the present invention may be classified (1) as a passage door latch permitting access through a passageway and into and out of a room or other enclosure by a mere turning of the knob or handle at either side of the door or closure; (2) a privacy lock on which the door is provided with an inner knob or handle having a turn button or push button adapted to normally lock the outer knob or handle against turning movement and retraction of the latch bolt until the button at the interior is released, whereupon the door may be opened by turning either knob; and (3) a lock assembly in which the inner knob is provided with or without a locking turn button or push button for locking the latch bolt against retraction and the outer knob of the door is provided with a key-operated lock for gaining access from the exterior.

The present invention comprehends the provision of a novel latch bolt assembly with or without an accompanying dead bolt or dead latching mechanism, and more particularly to a novel collapsible means and mechanism for actuating and retracting the latch bolt, or for actuating and retracting the latch bolt and accompanying dead bolt.

An important object of the present invention is the provision of a novel collapsible bracket and retractor affixed to and carrying the latch bolt, the bracket and retractor being bformed of metal and so constructed and arranged as to effect a greater length of throw of the latch bolt than possible with prior types of retractors or means for retracitng the latch bolt. This permits a throw of substantially greater length in a simple and inexpensive type of retractor than possible with prior types and in which the bolt because of the length of throw remains effective for positive latching even though there be warpage or misalignment between the door and the door jamb carrying the striker plate.

In the present novel embodiment of door latch mechanism the latch bolt assembly comprises a relatively small tubular housing requiring but a small opening in the edge of the door, such assembly including a resiliently mounted latch bolt with or without a dead bolt projecting forwardly or outwardly from one end of a tubular housing, a novel collapsible bolt bracket and retractor projecting rearwardly from the housing and capable of being collapsed sufficiently to be projected through the edge opening of the door for receiving and cooperating with a roll-back on the lockset projecting through a side opening extending transversely through the door and at a right angle to the opening for receiving the latch bolt assembly.

Another important object of the present invention is the provision in the latch assembly of a novel bolt bracket and collapsible retractor which has a projecting part normally of substantially greater width or dimensions than the diameter of the housing but capable of being retracted to a width no greater than the diameter of the housing whereby the projected end carrying the bolt bracket and retractor may be readily inserted through its opening in the edge of the door and retained therein by the expanded bracket and retractor.

The disclosed embodiment of illustrated collapsible latch bolt assembly has numerous novel features, advantages and capabilities readily distinguishing it from prior latch bolt assemblies, including the following:

(1) The assembly provides for a throw of one-half inch or more which is substantially longer than in prior devices. This is due to the increased width of the inner end of the retractor and its arrangement with the roll-back to effect a longer stroke.

(2) The assembly when mounted in operative position is securely anchored and retained upon a square stud on the lockset and projecting through the transverse opening in the door.

(3) Any slam thrust is taken not only on the bolt but also on the vertically spaced sections of the bolt retractor.

(4) Provides for controlled tolerances between the vertically spaced sections of the retractor and the latch housing.

(5) The end lock or any means of locking on the retractor which permits relative movement between these vertically spaced sections, assures freedom against binding of either section with the latch housing during operation.

(6) In the installation of the pre-assembled latch bolt and its expansible and collapsible retractor into a bored hole in the edge of a door which hole conformably receives the latch housing, the retractor when expanded being of substantially greater width or dimensions than the diameter of the bored hole, is readily collapsed sufficiently to be forced through the hole and when inserted to operative position automatically expands and reverts so its original expanded position. Thus, it may be installed in a door without the use of any tools and when intended to be removed merely requires that the retractor be collapsed sufficiently to reduce its dimensions below that of the bored hole, whereupon it may be withdrawn.

(7) The tension of the vertically spaced sections or legs of the retractor when inserted into the bored hole in the door is such is to assure retention of the latch bolt assembly therein during shipment, storage, painting, etc., and in this position permits ready assembly of the remainder of the lockset.

(8) In this novel assembly, with a non-mortise type latch housing, no screws or other means are required for holding the latch bolt assembly in operative position.

(9) When the latch bolt is equipped with a dead bolt or dead-latching mechanism, the vertically spaced sections provide the equivalent of a double lock in the dead bolt assembly.

Further objects are to provide a construction of maximum simplicity, efficiency, economy and ease of assembly and operation, and such further objects, advantages and capabilities as will later more fully appear and are inherently possessed thereby.

In the drawings:

FIG. 7 is an enlarged view, part in vertical cross section and part in side elevation, of the latch bolt assembly provided with a dead bolt.

FIG. 8 is an enlarged view, part in horizontal cross section and part in plan, of the assembly of FIG. 7.

FIG. 9 is a vertical cross sectional view through the tubular housing and contained parts, taken on the line 9—9 of FIG. 7 and viewed in the direction of the arrows.

FIG. 10 is a view in side elevation of the locking bracket for the latch and dead bolt assembly of FIGS. 7, 8 and 9, this bracket being shown in greater detail in FIG. 12.

FIG. 11 is a view in side elevation of the bolt bracket for the latch and dead bolt assembly, the bracket being shown in greater detail in FIG. 13.

FIG. 12 is an enlarged perspective view of the locking bracket of FIG. 10.

FIG. 13 is an enlarged view in perspective of the collapsible bolt bracket and retractor of FIG. 11.

FIG. 14 is a view in side elevation of the latch bolt of the latch and dead bolt assembly of FIGS. 7, 8 and 9.

FIG. 15 is a view in rear elevation of the latch bolt of FIG. 14.

FIG. 16 is a view in side elevation of the dead bolt.

FIG. 17 is a top plan view of the dead bolt.

FIG. 18 is a view in perspective of the spring bracket shown in assembled relation in FIG. 8.

FIG. 19 is a top plan view of the locking lever pin for the dead bolt.

FIG. 20 is a view in side elevation of the locking lever of FIG. 19.

FIG. 21 is an end elevation of the locking lever of FIG. 19.

Figure 1:
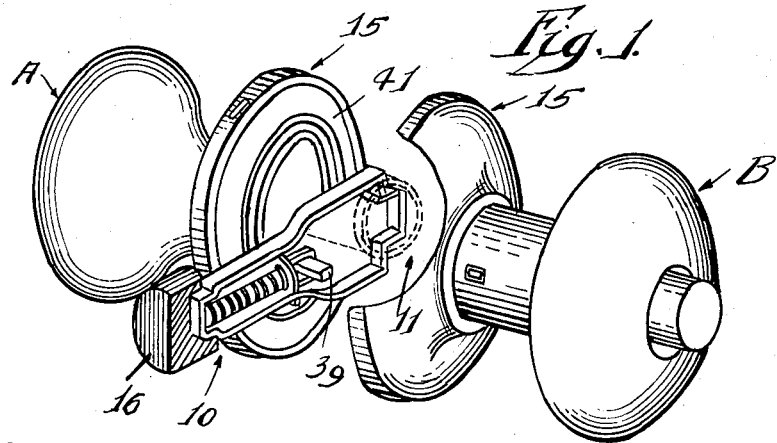
FIGURE 1 is a fragmentary view in perspective of a latch bolt assembly for mounting in the side rail of a door, portions of the housing being broken away to show the details of the latch bolt bracket and retractor.

Referring more particularly to the disclosure in the drawings and to the novel illustrative embodiment of the latch bolt assembly of FIGS. 1 to 6, inclusive, the present novel assembly is adapted for use in a door or closure (1) permitting free access or passage between rooms or into and out of a room or other enclosure by a mere turning of either knob, (2) a privacy lock where the door is adapted to be locked and unlocked from one side of the door by means of a push button or a turn button, and (3) or a key lock construction where the door is opened from the exterior by means of a key but embodying no dead bolt as in the embodiment of FIGS. 7 to 21, inclusive.

The novel embodiment shown in detail in FIGS. 7 to 21, inclusive, is more particularly directed to the novel latch bolt assembly for a door or closure including a dead bolt or dead latching mechanism whereby unlawful entry by retraction of the latch bolt from its locked position by means of pressure applied by an instrument to the projected end of the latch bolt is prevented.

With respect to the embodiment of FIGS. 1 to 6, inclusive, the novel latch bolt assembly 10 is preassembled and capable of being inserted and tensionally retained in an edge opening in the door, and when so assembled is readily and easily joined to the tube assembly 11 of a locket projecting through an opening extending transversely through the side rail of the door at a right angle to the opening in the edge of the door.

The tube assembly 11 includes a split tube 12 having an intermediate portion cut away at 13 to provide a rollback 14 for retracting the latch bolt upon rotation of the tube in either direction by the outer knob A or the inner knob B each suitably affixed to the adjoining end of the tube assembly. An escutcheon 15 is mounted at each of the opposite sides of the door to cover the transverse opening in the door and the mechanism in said opening.

The novel latch bolt unit or assembly 10 for a passage door comprises a simple and inexpensive assembly including a latch bolt 16 rigidly affixed or staked to the reduced forward end 17 of a collapsible latch bolt bracket and retractor 18. This bracket and retractor 18 is formed of suitable metal of substantial width bent or formed to provide vertically spaced parallel sides or sections 19 and 21 conformably received and retained at one end within a cylindrical housing 22, the latter being conformably received within a passage or hole bored into the edge of the door and opening into a larger transverse passage or bored hole for receiving the tubular lockset unit to the ends of which are mounted the outer and inner knobs A and B. The rearwardly extending portions 23 and 24 of the sides or sections 19 and 21 are collapsible and bent outwardly and when released, expanded and spaced apart a distance substantially greater than the diameter of the housing 22. Adjacent their inner ends each section is inturned to provide a shoulder at 25 and 26, with the inturned shoulder 25 having a rearward or longitudinal end projection 27 extending approximately normal to the shoulder. The shoulder 26 has a rearward projection 28 extending substantially normal thereto and then extending across the top to form an end or bridging connection at 29 with its end 31 bent forwardly and extending substantially parallel to and thereat receiving the projecting end 27. In the fully expanded position shown in FIG. 2, the projections 27 and 31 of the bracket and retractor are in abutting relation.

The housing is shown provided at its outer end with a non-mortise type face plate 32 having an opening conforming to the countour of and of a size to permit free projection and retraction of the latch bolt by turning either knob, and at its inner end provided with a tail piece 33 providing a closure having opposed slots 30 through which project the spaced legs or sections of the bracket and retractor 18, and spaced legs 34 and 35 formed integral with or rigidly affixed to the tail piece, the leg 34 being extended to provide a bridging portion 36 and an overlapping and forwardly projecting abutting end portion 37 forming a transverse opening 38 to receive a conforming square anchoring stud 39 on a clamp plate 41 disposed within a covering escutcheon plate 15. An expansion spring 42 bearing at one end against the inner or staked end of the latch bolt 16 and at its other end against the tail piece 33, spring-biases the latch bolt 16 to latching position.

Figure 2:
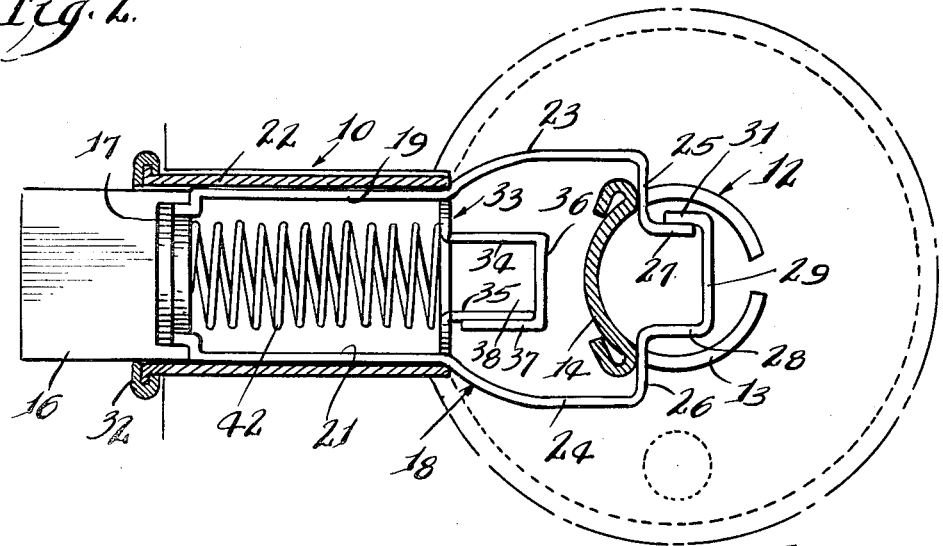
FIG. 2 is an enlarged view in side elevation of the novel latch bolt assembly of FIG. 1 with the housing and roll-back in section.
Figure 4:
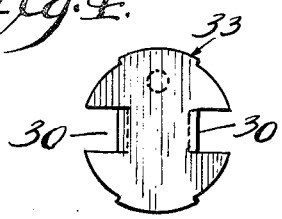
FIG. 4 is a bottom plan view of a tail piece for the housing of the latch bolt assembly.
Figure 5:
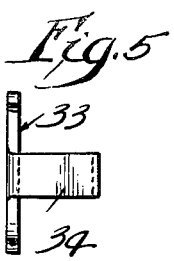
FIG. 5 is a view in side elevation of the tail piece of FIG. 4.

In the assembly of the latch bolt housing and retractor as shown, the retractor 18 is collapsed and from the exterior directed through the bored hole in the edge of the door. This is readily accomplished as the vertically spaced sections 19 and 21 are of relatively thin metal and the outwardly expanded portions 23 and 24 readily collapsed to an external dimension less than the diameter of the bored hole. The housing 22 being conformably received in the bored hole, with a non-mortise type of housing as shown in FIG. 2, no other securing means such as screws or the like are required for the expanded portions 23 and 24 effectively retain the latch bolt assembly in the bored hole prior to the assembly being securely anchored on the stud 39. Thus, prior to the complete assembly of the lockset, the latch bolt unit is automatically retained in place in the door during shipment or storage, while the door is being painted or finished, etc., which is a decided advantage over prior assemblies. In the final assembly, the latch bolt unit is securely anchored to and retained by the stud 39.

To remove the latch bolt assembly from the door, it will be evident the inner ends of the retractor must be contracted or collapsed to allow for withdrawal through the bored hole.

In the embodiment of FIGS. 7 to 21, inclusive, in which the latch bolt unit or assembly is provided with a dead latching mechanism including a dead bolt, the latch and dead bolt unit shown assembled in FIGS. 7, 8 and 9, comprises a latch housing 43 conformably received in an opening in the edge of the door and shown affixed to a mortise type face plate 44 adapted to be anchored to the edge of the door by suitable anchoring means, such as screws 45. However, the assembly of FIGS. 7, 8 and 9 is equally adapted for use with a non-mortise type latch housing as shown in FIG. 2.

The inner or rear end of the housing 43 is closed by a tail piece 46 staked or rigidly anchored in this end and having a fixed projecting part or extension 47 provided with a transverse opening 48 adapted to receive and be securely anchored to a conforming anchoring stud 39 on the clamp plate 41 of the outer tube and knob unit, in the manner shown in FIG. 1.

In the latch housing 43 is mounted the outer or forward reduced end 49 of a latch bolt bracket and retractor 51 (FIGS. 7, 8, 11 and 13) and the outer or forward end 52 of a substantially U-shaped locking bracket 53 substantially conforming to the retractor (FIGS. 10 and 12) with the end 52 being staked within the recessed rear of a latch bolt 54. The end 49 of the latch bolt bracket and retractor 51 is retained within the recessed rear of the latch bolt 54 by means of a spring bracket 55 (FIGS. 8 and 18) and expansion spring 56, the spring bracket 55 having a reduced inturned end 57 projecting into one end of a short coil spring 56 and the other upstanding end 58 of the spring bracket projecting over and retaining the ends 49 and 52, with the other end of the spring 56 bearing against the forward end 52 of the locking bracket 53 as shown in FIG. 8. An expansion spring 59 bears at one end against the inner or rear end of a latch bolt 54 and at its other end against the tail piece 46 of the latch housing 43 for spring-biasing the latch bolt to latching position.

Figure 3:
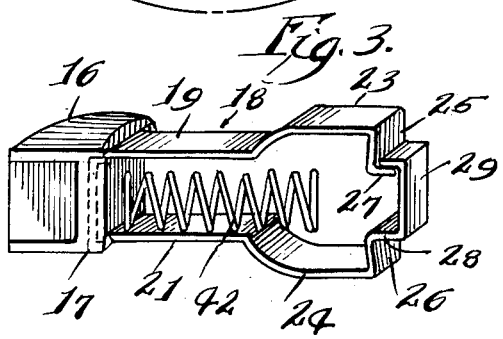
FIG. 3 is a perspective view of the novel collapsible bolt bracket or retractor, spring and attached latch bolt removed from the housing.
Figure 6:
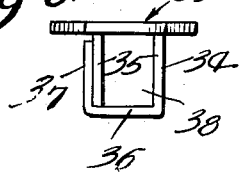
FIG. 6 is a view in front elevation of the tail piece of FIG. 4.

The latch bolt bracket and retractor 51 is formed of metal like that of FIGS. 1, 2 and 3, except that one edge of its vertically spaced sides or sections 19a and 21a is provided with an inclined camming surface at 62 and the reduced forward end 49 anchored to the latch bolt 54 by spring bracket 55 and expansion spring 56 is of greater length than the end 17 of the embodiment of FIGS. 1, 2 and 3. The spaced sides 19a and 21a are provided with offsets at 19b and 21b, respectively, and with rearwardly and outwardly expanded portions 23a and 24a having inturned projections forming a shoulder at 25a and 26a. The inturned shoulder 25a has a rearward or longitudinal end projection 27a and the shoulder 26a has a rearward or longitudinal projection 28a bent at the rear upwardly to provide a bridging connection at 29a with its end 31a bent forwardly. This end extends parallel to and receives the projecting end 27a to permit the expanded portions 23a and 24a to be collapsed for insertion through the bored hole in the edge of the door in the assembly of the latch bolt unit, and to limit the extent of expansion.

The base or web 63 joining the sides 19a and 21a is shown notched at 64 for aligning and retaining a dead bolt 65. The U-shaped locking bracket 53 has its spaced sides 66 and 67 closely conforming to the contour of the vertically spaced sides 19a and 21a of the latch bolt bracket and retractor 51 with its base or web 68 also notched at 69 in alignment with the notch 64 for the dead bolt 65, and with each side 66 and 67 cammed or notched at 71 and provided with an abutment or shoulder at 72.

The dead bolt 65 (FIGS. 7, 8, 9, 16 and 17) comprises a forwardly projecting tubular part 73 having its inner end 74 spread apart and provided with upwardly stepped bifurcations or spaced camming projections 75 in contact with spaced downwardly and forwardly inclined legs 76 of a locking lever 77 (FIGS. 7, 8, 9, 18, 19 and 21). Through an opening in the end wall or connecting web 78 of the locking lever projects an elongated pin 79 loosely received in the inner or rear end and guiding longitudinal movement of the tubular dead bolt 65. A coil or expansion spring 81 encompasses the pin 79 with the outer or forward end of the spring abutting the inner end of the dead bolt 65 and the other or rear end of this spring abutting the connecting web 78 of the locking lever 77 which is shown in FIG. 7 as tilted with the ends of its legs 76 disposed above and in contact with the rearwardly extending camming projections 75 of the dead bolt 65. In this position it is over but adapted to be moved into camming engagement with the camming surfaces 62 of the spaced sides 19a and 21a of the bolt bracket and retractor 51 and with the notched or camming surfaces 71 of the locking bracket 53, when the dead bolt is moved inwardly upon retraction of the latch bolt 54.

In the assembled relation of the dead latching mechanism of FIGS. 7 to 21, inclusive, as shown in FIG. 9, the spaced legs 76 of the locking lever 77 are of such width as to span the opposite sides of the locking bracket 53, those of the latch bolt bracket 51 and also the spaced camming projections 75 of the dead bolt 65. As the dead bolt is retracted without retracting the latch bolt 54, the legs 76 of the locking lever 77 ride over the camming surfaces on the spaced rearward projections 75 of the dead bolt 65 and engage the shoulders 72 on the sides 66 and 67 of the locking bracket 53 to prevent retraction of the latch bolt 54. The above positioning of the latch bolt and dead bolt is effected when the door containing the latch bolt assembly is closed with the latch bolt projecting into the strike plate and the dead bolt abutting the strike plate. This novel locking embodiment provides a dual locking arrangement in the dead bolt assembly.

To permit opening of the door housing the latch bolt assembly, the roll-back 14 is rotated to engage one of the shoulders 25a, 26a of the latch bolt bracket and retractor 51. The retractor can be moved relative to the locking bracket 53 due to the compression spring 56 and spring bracket 55 in the latch bolt 54. Rearward movement of the retractor 51 causes the camming surfaces 62 on the retractor to engage and lift the spaced legs 76 of the locking lever 77 away from the shoulders 72 of the locking bracket 53 and thus release the locking bracket which is then retracted by the retractor 51 along with the latch bolt 54 to permit the door to be opened.

Having thus disclosed the invention, I claim:

1. In a door lock having a tubular part extending through a transverse opening in and to the opposite sides of the door with a knob at each side of the door for turning of the tubular part and a roll-back on said part within the opening, and a latch bolt assembly mounted within an aperture in the edge of the door including a tubular housing, a latch bolt slidably mounted in the front of said housing, a tail piece providing a closure for the rear of the housing, a bolt bracket and retractor having spaced legs of flat metal joined together at their forward end and thereat affixed to the latch bolt, an expansion spring in said housing for spring-biasing the latch bolt to latching position, said legs projecting rearwardly through the housing and tail piece in spaced relation with each leg rearwardly of said housing being bent to provide diverging collapsible portions having a substantially greater width than the diameter of the housing and receiving the roll-back therebetween, each leg rearwardly of said diverging portions being bent inwardly to provide a flat shoulder and each shoulder contacted by an edge of the roll-back on said tubular part, the rear end of one leg beyond its shoulder provided with a free projection and the rear end of the other leg beyond its shoulder being bent rearwardly, then laterally and then forwardly and bridging the projection of the other leg in such manner as to limit spreading and separation of said rear ends.

2. In a door lock as set forth in claim 1, in which the latch bolt assembly is a preformed unit inserted into the aperture in the edge of the door with the diverging portions pressed together to decrease their spacing to approximately that of the diameter of the housing, whereby said diverging portions and the rear end of the legs of said bolt bracket and retractor may be pressed together and forced through the aperture in the edge of the door for connection to the roll-back.

3. In a door lock having a tubular part extending through a transverse opening in and to the opposite sides of the door with a knob at each side of the door for turning of the tubular part and a roll-back on said part within the opening, and a latch bolt assembly mounted within an aperture in the edge of the door including a tubular housing, a latch bolt slidably mounted in the front of the housing, a bolt bracket and retractor having spaced legs of flat metal joined together at their forward end and thereat affixed to the latch bolt, means to bias the latch bolt to latching position, said legs projecting rearwardly through the housing in spaced relation with each leg rearwardly of the housing being bent to provide diverging collapsible portions having a substantially greater width than the diameter of the housing and receiving the roll-back therebetween, each leg rearwardly of said diverging portions being bent inwardly to provide a flat shoulder and each shoulder contacted by an edge of the roll-back on said tubular part, the rear end of one leg beyond its shoulder provided with a free projection and the rear end of the other leg beyond its shoulder being bent rearwardly, then laterally and then forwardly and bridging the projection of the other leg in such manner as to limit spreading and separation of said rear ends.

4. In a door lock having a tubular part extending through a transverse opening in and to the opposite sides of the door with a knob at each side of the door for turning of the tubular part and a roll-back on said part within the opening, and a latch bolt assembly mounted within an aperture in the edge of the door including a tubular housing, a spring-biased latch bolt slidably mounted in said housing and biased toward latching position, and a retractor actuated by rotating the tubular part and roll-back for retracting the latch bolt, said retractor formed of flat flexible metal with a base anchored on the latch bolt, a pair of spaced parallel legs extending through said tubular housing and rearwardly of the housing being bent to provide diverging collapsible portions encompassing the roll-back with the diverging portions terminating in inwardly extending shoulders contacting the edges of the roll-back, the extreme rear ends of the legs extending rearward from the shoulders and being unattached but arranged in overlapping relation whereby the flexible legs may be collapsed sufficiently to be projected through said edge aperture of the door during assembly, the legs expanding to retain the latch bolt assembly in the door, and the overlapping portion of the legs providing means to limit spreading of the legs.

References Cited by the Examiner
UNITED STATES PATENTS

| | | | |
|---|---|---|---|
| 2,250,727 | 7/1941 | Schlage | 292—169 |
| 2,415,264 | 2/1947 | Sutphin | 292—169 |
| 2,742,310 | 4/1956 | Russell | 292—169 |
| 2,859,997 | 11/1958 | Green | 292—169 |
| 3,020,073 | 2/1962 | Williams | 262—169 |
| 3,042,437 | 7/1962 | Duvall | 292—169 |

JOSEPH D. SEERS, *Primary Examiner.*

M. HENSON WOOD, JR., DONLEY J. STOCKING,
*Examiners.*

S. LEITNER, J. R. MOSES, *Assistant Examiners.*